United States Patent
Berg et al.

(10) Patent No.: US 7,346,047 B1
(45) Date of Patent: *Mar. 18, 2008

(54) METHOD AND APPARATUS FOR BACKHAUL OF TELECOMMUNICATIONS SIGNALING PROTOCOLS OVER PACKET-SWITCHING NETWORKS

(75) Inventors: Diane M. Berg, Fairfax, VA (US); David Auerbach, Reston, VA (US); Kenneth Alfred Morneault, Marshall, VA (US)

(73) Assignee: Cisco Technology, Inc., San Jose, CA (US)

( * ) Notice: Subject to any disclaimer, the term of this patent is extended or adjusted under 35 U.S.C. 154(b) by 907 days.

This patent is subject to a terminal disclaimer.

(21) Appl. No.: 10/704,051

(22) Filed: Nov. 6, 2003

Related U.S. Application Data

(63) Continuation of application No. 09/323,272, filed on Jun. 1, 1999, now Pat. No. 6,680,952.

(51) Int. Cl.
*H04J 12/66* (2006.01)
*H04L 12/28* (2006.01)

(52) U.S. Cl. .................. 370/352; 370/401; 370/410; 370/466

(58) Field of Classification Search .................. None
See application file for complete search history.

(56) References Cited

U.S. PATENT DOCUMENTS

| | | | |
|---|---|---|---|
| 4,511,762 A | 4/1985 | Stockdale | 179/9 |
| 4,979,207 A | 12/1990 | Baum et al. | 379/112 |
| 5,027,388 A | 6/1991 | Bradshaw et al. | 379/112 |
| 5,182,748 A | 1/1993 | Sakata et al. | 370/94.1 |
| 5,208,809 A | 5/1993 | Fergeson et al. | 370/91 |
| 5,239,542 A | 8/1993 | Breidenstein et al. | 370/79 |
| RE34,536 E | 2/1994 | Frimmel, Jr. | 379/88 |
| 5,325,426 A | 6/1994 | Held | 379/337 |
| 5,414,762 A | 5/1995 | Flisik et al. | 379/198 |
| 5,420,916 A | 5/1995 | Sekiguchi | 379/230 |
| 5,426,694 A | 6/1995 | Hebert | 379/242 |
| 5,428,771 A | 6/1995 | Daniels et al. | 395/575 |
| 5,440,741 A | 8/1995 | Morales et al. | 395/650 |

(Continued)

FOREIGN PATENT DOCUMENTS

EP 1096766 A2 5/2001

(Continued)

OTHER PUBLICATIONS

Low, Colin, "The Internet Telephony Red Herring," 1996, IEEE, pp. 72-80.

(Continued)

*Primary Examiner*—Andrew C. Lee
(74) *Attorney, Agent, or Firm*—Hickman Palermo Truong & Becker LLP

(57) ABSTRACT

A generic backhaul protocol is provided for passing telecommunication signaling messages according to multiple signaling protocols between a gateway and a media gateway controller. A message in accordance with the generic backhaul protocol includes a message header that indicates the signaling protocol and/or the channel being used on the gateway. The message also includes a message body that contains a protocol data unit encapsulating signaling data in accordance with a signaling protocol.

49 Claims, 4 Drawing Sheets

U.S. PATENT DOCUMENTS

| | | | |
|---|---|---|---|
| 5,450,407 A * | 9/1995 | Perlman et al. | 370/392 |
| 5,450,483 A | 9/1995 | Williams | 379/279 |
| 5,517,563 A | 5/1996 | Norell | 379/220 |
| 5,530,434 A | 6/1996 | Kanda | 340/825.04 |
| 5,535,336 A | 7/1996 | Smith et al. | 395/200.06 |
| 5,535,373 A | 7/1996 | Olnowich | 395/500 |
| 5,537,679 A | 7/1996 | Crosbie et al. | 455/132 |
| 5,539,787 A | 7/1996 | Nakano et al. | 375/377 |
| 5,543,785 A | 8/1996 | Vatt et al. | 345/825.44 |
| 5,546,450 A | 8/1996 | Suthard et al. | 379/207 |
| 5,546,453 A | 8/1996 | Hebert | 379/242 |
| 5,550,820 A | 8/1996 | Baran | 370/60.1 |
| 5,557,652 A | 9/1996 | Jonsson | 379/57 |
| 5,581,558 A * | 12/1996 | Horney et al. | 370/401 |
| 5,610,910 A | 3/1997 | Focsaneanu et al. | 370/351 |
| 5,703,876 A | 12/1997 | Christie | 370/395 |
| 5,793,771 A | 8/1998 | Darland et al. | 370/467 |
| 5,815,501 A | 9/1998 | Gaddis et al. | 370/402 |
| 5,828,666 A | 10/1998 | Focsaneanu et al. | 370/389 |
| 5,838,781 A | 11/1998 | Isaksson | 379/229 |
| 5,848,070 A | 12/1998 | Durvaux et al. | 370/442 |
| 5,862,339 A | 1/1999 | Bonnaure et al. | 395/200.57 |
| 5,878,224 A | 3/1999 | Smith | 395/200.54 |
| 5,889,762 A | 3/1999 | Pajuvirta et al. | 370/230 |
| 5,898,839 A | 4/1999 | Berteau | 395/200.57 |
| 5,933,490 A | 8/1999 | White et al. | 379/221 |
| 5,987,118 A | 11/1999 | Dickerman et al. | 379/265 |
| 5,991,292 A | 11/1999 | Focsaneanu et al. | 370/352 |
| 6,018,519 A | 1/2000 | Ginzboorg | 370/236 |
| 6,021,126 A | 2/2000 | White et al. | 370/352 |
| 6,084,892 A | 7/2000 | Benash et al. | 370/701 |
| 6,111,893 A | 8/2000 | Volftsun et al. | 370/466 |
| 6,112,305 A | 8/2000 | Dancs et al. | 713/156 |
| 6,125,127 A | 9/2000 | Smith, Jr. | 370/524 |
| 6,141,345 A | 10/2000 | Goeddel et al. | 370/389 |
| 6,151,390 A | 11/2000 | Volftsun et al. | 379/229 |
| 6,175,565 B1 | 1/2001 | McKinnon et al. | 370/354 |
| 6,205,212 B1 | 3/2001 | Swale | 379/133 |
| 6,212,188 B1 | 4/2001 | Rochberger et al. | 370/395 |
| 6,233,542 B1 * | 5/2001 | Butts et al. | 703/27 |
| 6,400,724 B1 | 6/2002 | Yao | |
| 6,411,705 B2 | 6/2002 | Oran et al. | 379/230 |
| 6,490,451 B1 | 12/2002 | Denman et al. | |
| 6,674,713 B1 * | 1/2004 | Berg et al. | 370/217 |

FOREIGN PATENT DOCUMENTS

| | | |
|---|---|---|
| EP | 1109368 A2 | 6/2001 |
| EP | 1179927 A2 | 2/2002 |
| GB | 2355362 A | 4/2001 |
| WO | WO95/31057 | 11/1995 |
| WO | WO97/09807 | 3/1997 |
| WO | WO97/09808 | 3/1997 |
| WO | WO00/76107 A2 | 12/2000 |
| WO | WO01/43387 A2 | 6/2001 |

OTHER PUBLICATIONS

Huitema, et al., Christian, "An Architecture for Residential Internet Telephony Service," May 1999, IEEE Internet Computing, pp. 73-82.

* cited by examiner

METHOD AND APPARATUS FOR BACKHAUL OF TELECOMMUNICATIONS SIGNALING PROTOCOLS OVER PACKET-SWITCHING NETWORKS

RELATED APPLICATION

This application is a continuation of and claims priority to U.S. patent Ser. No. 09/323,272, entitled "Method and Apparatus for Backhaul of Telecommunications Signaling Protocols Over Packet-Switching Networks," filed by Diane M. Berg, et al., Jun. 1, 1999 now U.S. Pat. No. 6,680,952, the contents of which are herein incorporated by reference for all purposes.

FIELD OF THE INVENTION

The present invention relates to telecommunications and more particularly to backhauling telecommunications signaling protocol over packet-switching networks.

BACKGROUND OF THE INVENTION

There is significant market need and technical interest in finding ways to communicate voice information and call signaling information over existing data networks. An example application in this field is sending telephone calls, including both the voices of the calling parties and call set-up, tear-down, and related signaling information, over a packet-switched data network. There is particular interest in providing telephone call capability over the global, packet-switched public data network known as the Internet. A key motivation for this technology is that voice calls carried over the Internet do not incur telephone call toll charges, which are imposed by long-distance carriers and certain local telephone call carriers in the public switched telephone network. In short, voice-over-Internet technology may offer callers the ability to place low-cost calls over open protocol networks.

A significant leap forward in this field has been taken by the introduction of protocol conversion and signaling connection systems. An example of such a system is the Cisco SC2200 Signaling Converter, commercially available from Cisco Systems, Inc. Other examples of such a system are described in U.S. patent application Ser. No. 08/904,295 entitled "Universal Protocol Conversion," filed on Jul. 31, 1997 by Lev Volftsun, et al., the entire contents of which are hereby incorporated by reference as if fully set forth herein.

Generally, such protocol conversion systems are implemented by a highly specialized computer system that interfaces to the data network and the public switched telephone network. The computer system executes one or more signaling protocol software applications to carry out the function of the system. The computer system may include one or more gateways that pass data signals to the telephone network and a media gateway controller that controls the gateways under control of a processor in the computer system.

One or more protocol converters may be configured, by running appropriate application software, as call processing devices or as signaling terminal devices. In some configurations, a call processing device is located logically remote from a signaling terminal device, coupled to it by an Internet Protocol (IP) network. In this configuration, there is a need to send telephone call signaling information, formatted according to standard telephony protocols, from a signaling terminal device back across the IP network to a call processing device. This is referred to as "backhauling" the signaling information.

As voice-over-Internet systems become more popular, it is necessary to support a larger number of channels from the gateway. It is difficult, however, to scale call processing devices to handle an increasing number of channels from the gateways. For example, a call processing device may manage a separate IP connection for every channel supported by each of the gateways.

Another difficulty in scalability is due to the capability of some gateways of supporting multiple signaling protocols over the same channel. One approach for handling such gateways is to provide an IP connection, not only for every channel on the gateway, but for every pair of channel and supported signaling protocols. For example, a gateway that supports 24 channels and 2 protocols would require 48 separate IP connections.

The performance in managing a separate IP connection for every channel or channel-protocol pair, however, tends to degrade after a certain number of IP connections, because the number of file descriptors and other operating system resources are limited. For example, some UNIX™ operating systems only allow up to 256 file descriptors, which translates to only about 250 supportable IP connections. When a call processing device is overloaded, a second call processing device would need to be purchased, often at a considerable cost.

SUMMARY OF THE INVENTION

There exists a need for a scalable telecommunications network that backhauls signaling data to a media gateway controller from gateways with multiple channels. There is also need for a backhauling methodology in a telecommunications network that is scalable also in terms of supporting multiple protocols multiplexed on a gateway.

These and other needs are addressed by the present invention, in which a generic backhaul protocol is employed for sending signaling data or messages between a gateway and a media gateway controller. The generic backhaul protocol provides a common message header that allows separate channels and/or protocols to be specified. Consequently, the media gateway controller can use the information in the message header to multiplex signaling messages from a plurality of channels and protocols over a single IP connection, notwithstanding the number of channels and protocols supported by the gateway. Therefore, the media gateway controller is advantageously scalable in terms of the number of gateways supported instead of in terms of the much larger number of supported channels and protocols.

Accordingly, one aspect of the invention relates to a telecommunications network, comprising a gateway and a media gateway controller. The gateway, which is configured to convert between multiplexed voice data and voice data packets, is in communication with a packet-switching network and a node originating a voice call bearing voice data and signaling data according to a signaling protocol over a channel. The media gateway controller is in communication with the gateway and a terminating gateway, which is in communication with the packet-switching network and a terminating node terminating the voice call. The media gateway controller is configured to control the gateway and the terminating gateway based on the first signaling data to provide voice communications over the packet-switching network between the first node and the terminating gateway.

The gateway is also configured to extract the signaling data from the voice call, package the signaling data into a message, and transmit the message to the media gateway controller, wherein the message includes a message header indicating the signaling protocol and/or the channel and a message body containing a protocol data unit encapsulating the signaling data.

Another aspect of the invention pertains to a telecommunications device comprising a communication interface in communication with a gateway; one or more processors coupled to the communication interface; and a memory coupled to the one or more processors. The memory stores an arrangement of instructions, which, when executed by the one or more processors, cause the telecommunications device to perform the steps of: instantiating a plurality of protocol adapters and/or call instances for processing signaling data according to a plurality of signaling protocols and/or channels, respectively; receiving a message from the gateway, which includes a message header indicating the signaling protocol and/or the channel and a message body containing a protocol data unit encapsulating the signaling data; and identifying and causing a protocol adapter and/or call instance, instantiated to process signaling data according to the signaling protocol and/or the channel, respectively, to process the signaling data encapsulated in the protocol data unit based on the message header.

Yet another aspect of the invention involves a method of backhauling signaling data in a voice call from a gateway to a media gateway controller. In accordance with the method, the voice call is received, and the signaling data is extracted from the voice call. The signaling data is packaged into a message, which includes a message header indicating a signaling protocol and/or a channel and message body including a protocol data unit encapsulating the signaling data. The message is transmitted from the gateway to the media gateway controller.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

Figure 1:
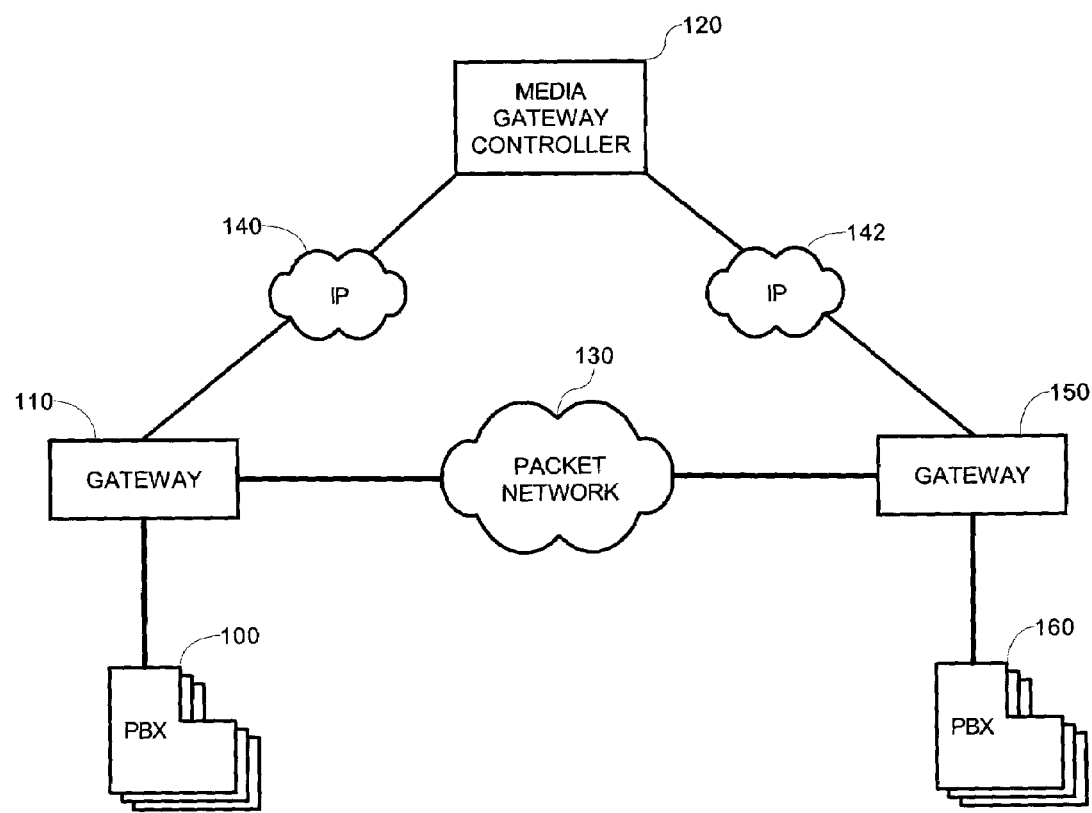
FIG. 1 is a diagram of a packet-switching network carrying voice signals.

A method and apparatus for providing voice communications over a packet-switching network infrastructure are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Terminology

In this document, certain technical terms may be used, and preferred definitions of some of terms are provided in this section. The following definitions are example definitions and are not meant to be exhaustive or restrictive. Each definition includes all equivalent structures or functions.

"Gateway" refers to a Media Gateway or Signaling Gateway. One example of a gateway is a Model 2600 Router available from Cisco Systems, Inc.

"Layer 1" refers to the Physical Layer of the Open Standards Institute (OSI) Reference Model defined in ITU X.200. Layer 1 is responsible for sending and receiving the electric signal, which can be viewed as a bit stream coming in, and going out, of the system. The precise meaning of the term will vary according to its context. For example, Layer 1 on a T1 channel operates at 1.544 Mbps, but Layer 1 on a DS-0 timeslot in the T1 channel is 64 kbps.

"Layer 2" refers to the Data Link Layer of the OSI Reference Model defined in ITU X.200. Layer 2 is responsible for point-to-point delivery of a PDU. Layer 2 protocols have two basic classes: reliable and unreliable. A reliable protocol guarantees that it will deliver or generate an error message for every message that an application program requests the transport layer using that protocol to transport. An unreliable protocol is not guaranteed to report an error message to the upper layers if delivery of application program messages does not occur.

"Layer 3" refers to the Network Layer of the OSI Reference Model defined in ITU X.200. Layer 3 is responsible for the network routing and delivery of a message. Examples of Layer 3 protocols include X.25 Packet Layer Protocol and the Internet Protocol. Q.931 is not technically considered a Layer 3 protocol, because Q.931 is not concerned with routing and delivery of a message but rather the message body itself.

"Media Gateway" refers to a hardware device and associated software that terminates PSTN facilities such as trunks. A media gateway may convert a pulse-coded-modulation signal stream from the trunks into Internet Protocol (IP) packets or Asynchronous Transfer Mode (ATM) packets or forward the signal stream to an IP network or ATM network. A media gateway can optionally support signaling backhaul.

"Media Gateway Controller" refers to a hardware device and associated software that provides call control capability to handle signaling traffic from a variety of sources. A media gateway controller manages connections and resources of the gateways. One example of a media gateway controller is a Model SC2200 Signaling Controller, available from Cisco Systems, Inc.

"Protocol Data Unit" or "PDU" is a generic term in ITU X.200 for the data passed between peer protocol layers. Each layer in the OSI Reference Model has its own definition of a PDU which is formed of the PDU from the next higher (N+1) layer and protocol control information for the Nth layer encapsulating it.

"Signaling Gateway" refers to a device that sends and receives PSTN signaling at the edge of or at an entry point of an IP or ATM network. A signaling gateway backhauls the PSTN signaling to a media gateway controller.

"Voice over IP" refers to the ability to carry normal telephone-style voice over a network that uses IP, with functionality, reliability, and voice quality equivalent to that provided by conventional telephone service.

Network Overview

FIG. 1 depicts a telecommunications network that provides voice communications from an originating node 100 to a terminating node 160 over a packet-switching network 130, in which the voice signaling processing is separated from the processing of the voice data. More specifically, the voice signaling aspects of establishing and handling voice calls over packet-switching network 130 are provided by one or more media gateway controllers, for example, media gateway controller 120. Aspects relating to the voice traffic of a voice call are handled by one or more gateways, for example, the originating gateway 110 and the terminating gateway 150.

For purposes of illustration, FIG. 1 depicts a network configuration in which the originating gateway 110 and the terminating gateway 150 are coupled to a single media gateway controller 120, but the signaling processing functionality can be distributed among a plurality of media gateway controllers, for example, one media gateway controller, coupled to the originating gateway 110, in communication with another media gateway controller, coupled to the terminating gateway 150. Even though the media gateway controllers and the gateways are generally described herein in terms of being separate devices, which can be geographically remote from one another, a media gateway controller and a gateway may also be incorporated as respective subsystems of a single computer system. Thus, the present invention is not limited to the configuration depicted in FIG. 1.

Originating node 100 can be implemented as a Private Branch eXchange (PBX), a telephone switch, a "smart phone" capable of generating voice calls, a wireless PBX, or a legacy telecommunications system. Similarly, terminating node 160 can also be a PBX, telephone switch, telephone, a wireless PBX, or a telecommunications system such as the public switched telephone network (PSTN). Thus, originating node 100 and terminating node 160 may receive voice calls via tandem trunks from other nodes for Voice over IP.

Packet-switching network 130 is a network designed to carry information in the form of digital data packets. In such a network, data to be transmitted is subdivided into one or more individual packets of data, each having a unique identifier and a destination address. Each packet is individually routed or switched to the destination address, and individual packets for a single body of data may traverse the packet-switching network by different routes. In fact, the individual packets may even arrive at the destination in a different order from which they were shipped, to be reassembled at the destination in the proper sequence based on the packet identifiers. Packet-switching network 130 can be implemented as an IP network, an ATM network, a frame relay network, or by any other packet-switching technology. In some implementations, the packet-switching network 130 may even be overlaid on the PSTN. One example of packet-switching network 130 is the global packet-switching network known as the Internet.

The telecommunication network of FIG. 1 includes an originating gateway 110 and a terminating gateway 150 functioning as gateways between the respective originating node 100 and the terminating node 160 and the packet-switching network 130. The originating gateway 110, coupled to the originating node 100 by a trunk such as a T1 line or an E1 line, converts multiplexed voice data produced by originating node 100 into packets for the packet-switching network 130. The voice data produced by originating node 100 may be, for example, Time Division Multiple Access (TDMA) and Code Division Multiple Access (CDMA) information. The originating gateway 110 can also be configured to support voice data encoding and decoding as well as associated functions such as echo cancellation, voice activity detection, and voice compression. Similarly, the terminating gateway 150 is also configured to convert between multiplexed voice data and voice data packets as well as the encoding and decoding functions.

A major purpose of the originating gateway 110 is to terminate the bearers from PBX 100, and extract or "groom" the signaling data associated with the incoming voice call from originating node 100. This signaling data is then transmitted or "backhauled" over a backhaul signaling link 140 to a signaling apparatus such as media gateway controller 120. The backhaul signaling link 140 can be implemented in various ways, preferably by an IP connection over Ethernet or other Local Area Network (LAN) technology such as token ring. The signaling data in the voice call can be Channel Associated Signaling (CAS), in which case the signaling bits are isolated, time stamped, packaged in IP or ATM packets, and shipped to the media gateway controller 120.

Similarly, the terminating gateway 150 is coupled by a backhaul signaling link 142 to a signaling apparatus such as the media gateway controller 120. The terminating gateway 150 is configured for receiving traffic from the originating gateway 110 over the packet-switching network 130 and signaling messages from the media gateway controller 120 and appropriately transmitting them to the terminating node 160. Preferably, the gateways are implemented to be symmetrical, supporting the functionality of both the originating gateway 110 and the terminating gateway 150 as described herein. In fact, a single gateway can performing the both the originating and terminating functionality for the same call.

The media gateway controller 120 implements a "virtual switch" and is responsible for processing and routing the signaling messages that are exchanged to set up and tear down a voice connection. Thus, the media gateway controller 120 performs such functions as call resolution, call routing, bearer selection, and generation of call detail records (CDRs) for billing management. In one embodiment, the media gateway controller 120 also converts the protocols of the originating node 100 and the terminating node 160, such as DPNSS, ISDN_PRI, SS7/C7 (including ISUPs, TUPs, and NUPs), H.323, SIP, or CAS, into messages in protocols handled by gateways 110 and 150 over backhaul links 140 and 142, respectively. Through the backhaul link, a gateway is also controlled by a media gateway controller, for example, to establish a bearer channel for the voice data over the packet-switching network 130.

In the configuration depicted in FIG. 1, a voice call from originating node 100 is received by the originating gateway 110, which extracts the signaling data associated with the voice call and transmits the signaling data over the backhaul signaling link 140 to the media gateway controller 120. In response, the media gateway controller 120 controls the terminating gateway 150 to establish a bearer channel for the voice through packet-switching network 130 and repackages the signaling messages for terminating node 160 over backhaul signaling link 142. In this manner, a voice telecommunications network is capable of conveying normal telephone-style voice over a packet-switching network with functionality, reliability, and voice quality equivalent to that provided by conventional telephone service.

Hardware Overview

In one embodiment, a media gateway controller 120 is implemented by a protocol converter configured to act as a virtual switch, and in alternative embodiments, especially where protocol conversion is not required, directly by a virtual switch. A protocol converter is a telecommunications device capable of processing and converting at least those messages for establishing a connection between different protocols. For example, a protocol converter can convert messages between the DPNSS protocol and the ISDN protocol.

One implementation of a protocol converter is described in more detail in the commonly assigned, co-pending U.S. patent application Ser. No. 08/904,295 entitled "Universal Protocol Conversion," filed on Jul. 31, 1997 by Lev Volftsun, et al., the entire contents of which are hereby incorporated by reference as if fully set forth herein. The above-referenced patent document discloses structural and functional details of an embodiment of a protocol converter that can be used to implement the media gateway controller 120.

Another embodiment is disclosed in the commonly assigned, co-pending U.S. patent application Ser. No. 09/163,312, entitled "Communicating Voice over a Packet-Switching Network," filed on Sep. 30, 1998 by Udaya Shankar et al., the entire contents of which are hereby incorporated by reference as if fully set forth herein. For purposes of context in this document, however, an overview of such structures and functions in an alternative embodiment is now provided.

Figure 2:
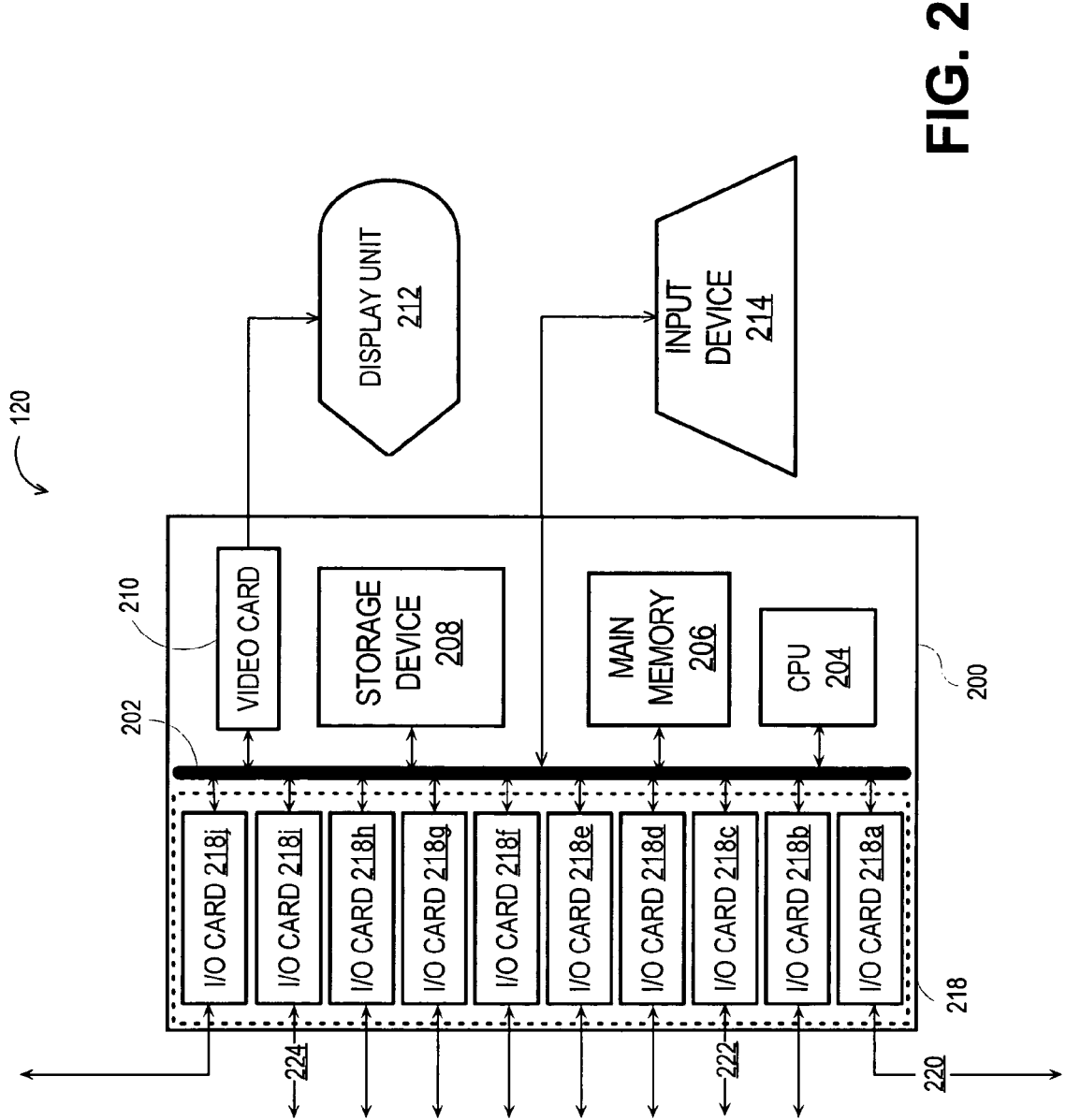
FIG. 2 is a block diagram of a media gateway controller.

Referring to FIG. 2, the hardware components of a protocol converter include a bus 202 or other communication mechanism for communicating information between internal components of the computer system 200. A central processing unit ("CPU") 204, comprising one or more processors, is coupled with bus 202 for processing information. Computer system 200 also includes a main memory 206 coupled to bus 202 for storing information and instructions to be executed by CPU 204. Main memory 206 typically includes a random access memory ("RAM") or other dynamic storage device, for storing temporary variables or other intermediate information during execution of instructions to be executed by CPU 204. Main memory 206 may also include a read only memory ("ROM") or other static storage device for storing static information and instructions for CPU 204. A storage device 208, such as a magnetic disk, magnetic tape, or optical disk, is provided and coupled to bus 202 for storing information and instructions.

In some implementations, computer system 200 includes a video card 210 coupled to bus 202 for controlling display unit 212, such as a cathode ray tube (CRT), a liquid crystal display (LCD), a video monitor or other display device, to display information to a computer user. An input device 214 is coupled to bus 202 for communicating information and command selections from a user to CPU 204. Typically an input device includes a keyboard with alphanumeric, symbolic, and cursor direction keys for receiving input from a user in the form of commands and data entry and communicating the input to CPU 204. The input device typically includes a cursor control input device, such as a mouse or a trackball, integral with or separate from the keyboard, for controlling cursor movement on display unit 212, and communicating direction information and command selections to CPU 204. A cursor control input device typically has two degrees of freedom in two axes, a first axis (e.g., x) and a second axis (e.g., y), that allows the device to specify positions in a plane. In other implementations, these devices are connected to the computer system via a local area network such as Ethernet.

Computer system 200 also includes a communication interface 218 coupled to bus 202 and comprising, for example, a plurality of I/O cards 218a through 218j. Ten I/O cards 218a through 218j are shown in FIG. 2, but any number of I/O cards, modems, transceivers, or other I/O devices may be used. Communication interface 218 provides a two-way data communication coupling to one or more gateways and zero or more other media gateway controllers. Some of the I/O cards 218a-218j can be coupled directly to SS7 or DPNSS links via multiplexer/digital cross connect (not shown).

At least one of the I/O cards, for example I/O card 218a, is in communication with a gateway 110 or 150 through control link 220. Communication interface 218 may include an integrated services digital network (ISDN) card, terminal adapter, or modem for providing a data communication connection to a corresponding type of telephone line. As another example, communication interface 218 may include a local area network (LAN) card to provide a data communication connection to a compatible LAN, for example an Ethernet network. Wireless links, such as infrared, for communication interface 218 may also be implemented. In any such implementation, communication interface 218 sends and receives electrical, electromagnetic or optical signals that carry digital or analog data streams representing various types of information, in the form of carrier waves transporting the information.

This configuration enables the use of a computer system 200 for providing voice communications in a packet-switching network. For example, such functionality is provided by computer system 200 in response to CPU 204 executing one or more sequences of one or more instructions arranged in main memory 206. These instructions may be written into main memory 206 from another computer-readable medium, such as storage device 208. Execution of the sequences of instructions contained in main memory 206 causes CPU 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to CPU 204 for execution. Such a medium may take many forms, including but not limited to non-volatile media, volatile media, and transmission media. Non-volatile media include, for example, optical or magnetic disks, such as storage device 208. Volatile media include dynamic memory, such as main memory 206. Transmission media include coaxial cables, copper wire and fiber optics, including the wires that constitute bus 202. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to CPU 204 for execution. For example, the instructions may initially be borne on a magnetic disk of a remote computer and downloaded to computer system 202. The remote computer can load the instructions into its dynamic memory and send the instructions over a telephone line using a modem. A communications interface 218 local to computer system 200 can receive the data on a telephone line or other network or telecommunication link and place the data on bus 202. Bus 202 carries the data to main memory 206, from which CPU 204 retrieves and executes the instructions. The instructions received by main memory 206 may optionally be stored on storage device 208 either before or after execution by CPU 204. The received instructions may be executed by CPU 204 as it is received, and/or stored in storage device 208, or other non-volatile storage for later execution. In this manner, computer system 200 may obtain application code in the form of a carrier wave.

Software Architecture

Figure 3:
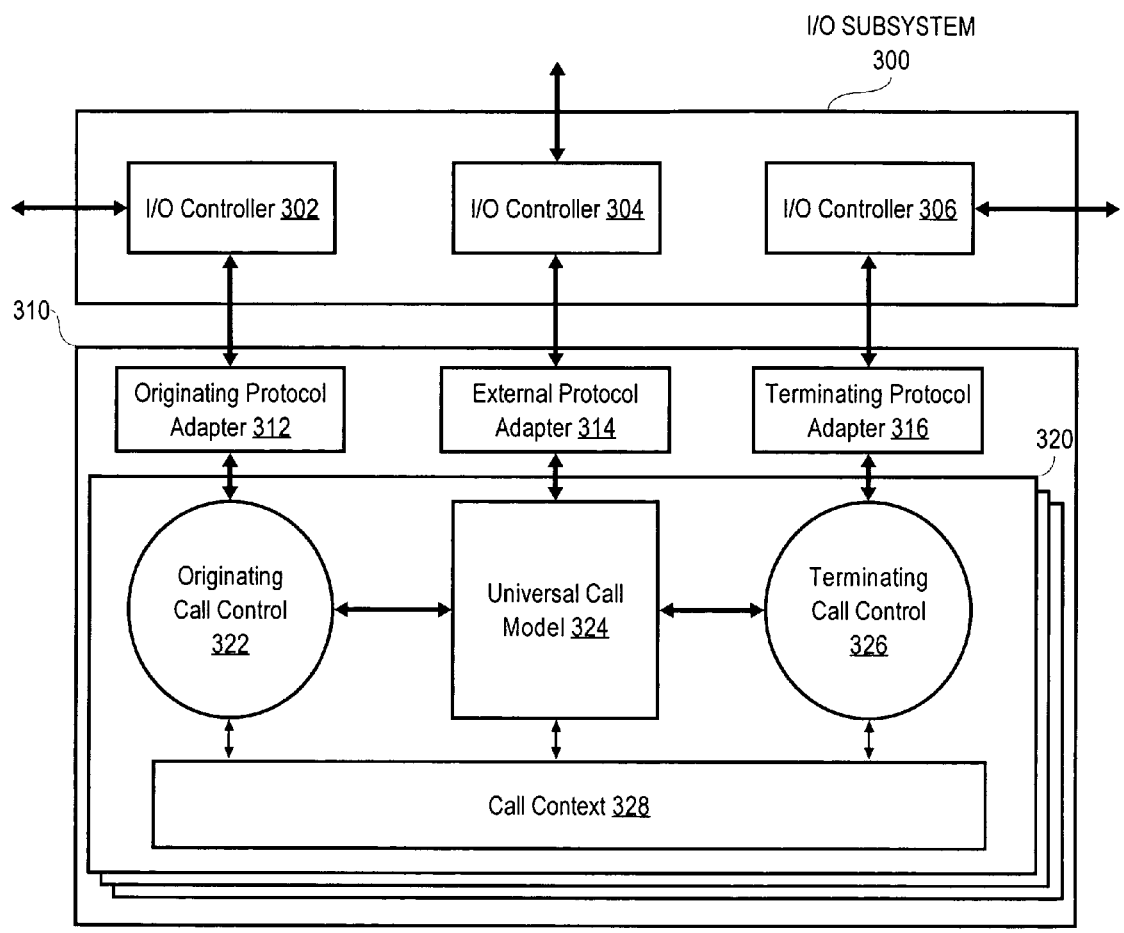
FIG. 3 is a block diagram of a software architecture of a media gateway controller.

FIG. 3 schematically illustrates a software architecture relating to protocol conversion implemented on a computer system 200 that implements media gateway controller 120. The software architecture includes an I/O subsystem 300 for handing generic backhaul protocol messages and a protocol conversion engine 310 for handling call processing messages at Layer 3. The signaling data from the gateway 110 or 150 is backhauled to the media gateway controller 120 in the form of generic backhaul protocol messages over a single session. The generic backhaul protocol messages include a header that indicates a protocol identifier and/or a channel identifier. Use of the protocol identifier, the channel identifier, or both allows all the messages from a gateway 110 or 150 to be multiplexed over a single session, thereby reducing the work load of the media gateway controller 120 and, hence, improving scalability.

I/O subsystem 300 contains I/O controllers 302, 304, and 306, configured for handling incoming generic backhaul protocol messages. As described in more detail hereinafter, generic protocol messages include a message header that indicates the signaling protocol and/or the channel on the gateway 110 or 150 and a message body that contains a PCU encapsulating a signaling message, such as call set-up message, in any of a plurality of supported protocols. Moreover, the I/O subsystem 300 is also responsible for converting PDUs generated by the protocol conversion engine 310 into generic backhaul protocol messages. Each I/O controller 302, 304, and 306 is responsible for messages from a network session handled by a corresponding I/O card of communications interface 218. In one embodiment the session is implemented by a single IP connection, but in other embodiments multiple, redundant IP connections are used to foster reliability. One example is disclosed in the commonly-assigned, co-pending U.S. patent application Ser. No. 09/256,688, entitled "Method and Apparatus for Providing Continuous Voice and Call Communications Between a Data Network and a Telephony Network" filed on Feb. 23, 1999 by Diane M. Berg, Kenneth A. Morneault, Thomas Bova, and Theodore S. Krivoruchka, the contents of which are hereby incorporated by reference herein.

The protocol conversion engine 310 includes a plurality of protocol adapters, implemented to support respective protocols or protocol families, and a number of call instances corresponding to each active call. A protocol adapter is a software module responsible for interfacing the protocol conversion engine 310 with the I/O subsystem 300. Specifically, a protocol adapter, when loaded and executed, is configured to connect with I/O subsystem 300 in order to route protocol-specific messages between a gateway 110 or 150 and the appropriate call instance. The appropriate protocol adapter is identified based on the protocol identifier in the message header of the generic backhaul protocol.

Multiple instances of the same protocol adapter may be loaded and executed, each of which is associated with a respective session. Although the protocol adapters are fundamentally bi-directional, it is convenient to refer to an originating protocol adapter 312, an external protocol adapter 314, and a terminating protocol adapter 316, based on their particular function during a call. Thus, a protocol adapter can be employed as an originating protocol adapter 312 for one call and as a terminating protocol adapter 316 for another call.

An originating protocol adapter 312 is capable of decoding an incoming message to determine the call with which the message is associated. Each message transmitted on a signaling channel contains a protocol-dependent value that serves to disambiguate messages for different calls from the same logical signaling channel on the gateway 110 or 150. The logical signaling channel on the gateway 110 or 150 is identified by the channel identifier in the message header of the generic backhaul protocol. Every telecommunications protocol provides some means for matching up a message with an associated call, for example, a specific call identifier embedded in the message (e.g., the Call Reference field used in ISDN_PRI) or the bearer channel identifier (e.g. with DPNSS and SS7/ISUP), but the present invention, which is capable of supporting many different protocols, is not limited to any particular means of matching up messages with the associated calls. Also, each call is identified internally with a unique integer identifier for the media gateway controller 120, referred to as a "Global Call Reference," which is generated when the call is first instantiated. The Global Call Reference distinguishes simultaneously handled calls from one another. When concatenated with a network or other identifier of the media gateway controller 120, the Global Call Reference serves to create a Universal Call Reference for the call that is unique for the network.

Accordingly, the originating protocol adapter 312 is configured to associate the Global Call Reference with a corresponding call instance 320. The corresponding call instance 320 is responsible for processing the call, including converting, if necessary, the protocol from the originating side to be compatible with the protocol at the terminating side. If the originating protocol adapter 312 can locate the corresponding call instance 320 for the message, then the protocol adapter 312 routes the message to the call instance 320 for further processing as described hereinafter. On the other hand, the originating protocol adapter 312 may not be able to find the corresponding call instance 320, for example, because the message is the first message pertaining to a call. In that case, the originating protocol adapter 312 is designed to instantiate a new call instance 320 corresponding to the particular phone call and to route the message into the new call instance for further processing.

When a new call instance 320 is instantiated, for example by originating protocol adapter 312, an appropriate terminating protocol adapter 316 for the call is determined based on an analysis of the content of the incoming messages and the path by which the message arrived. The logic for selecting a channel may be static or dynamic. For example, static logic may be implemented by a hard-coded table in a configuration file resident in storage device 208, and dynamic logic may be set up at run-time based on such factors as channel availability. A combination of static and dynamic techniques may be used as well. The terminating protocol adapter 316 indicates the proper I/O controller 306 and signaling protocol on the terminating side. The terminating protocol adapter 316 can route messages from associated call instances to the corresponding I/O controller 306, to a network node, and ultimately to the destination telephone. In accordance with the bi-directional nature of protocol adapters, a terminating protocol adapter 316 is configured also to receive protocol-specific messages from the terminating side of the network and pass them to the appropriate call instance. Likewise, an originating protocol adapter 312 can receive messages from a call instance 320 and pass them onto the corresponding I/O controller 302 for transmission to the appropriate destination.

An external protocol adapter 314 is a protocol adapter for interconnecting the protocol converter with an external system involved with the call. For example, the external protocol adapter 314 enables external systems to be involved in real-time Intelligent Networking (IN) call control such as Transaction Control Application Part (TCAP) communications with a C7 network Service Control Point (SCP). As another example, external protocol adapter 314 can employ a proprietary protocol for communicating with an external Fraud Control System involved in non-real-time control over the call. For implementing voice over packet-switching networks, the external protocol adapter 314 is used for real-time communication with a gateway such as originating gateway 110 and terminating gateway 150. Accordingly, the external protocol adapter 314 is responsible for connecting with the appropriate I/O controller 304 in the I/O subsystem 300 for sending and receiving messages with the gateway 110 or 150 and routing the messages to and from the proper call instance 320. In addition, external protocol adapter 314 is capable of instantiating one or more new call instances based upon a message received from the external channel. In such an event, the other protocol adapters 312 and 316 are directed to initiate a call from a logical "originating" node to a terminating node.

A call instance 320 is instantiated by an originating protocol adapter 312 (or an external protocol adapter 314) for processing a call and performing protocol conversion, if necessary. A call instance 320 may be implemented in a variety of ways, including by a separate process, thread, or an interruptible flow of execution that can be resumed. When the call instance 320 is instantiated, memory for originating call control ("OCC") 322, universal call model ("UCM") 324, and terminating call control ("TCC") 326 is allocated and initialized. The call instance 320 also contains a call context 328, which is a region of memory for storing information about the current call. Some call-related information that persists beyond the duration of the call may be stored in a database in main memory 206 or storage device 208 to implement billing records.

Preferably, OCC 322, UCM 324, and TCC 326 are implemented as state machines by objects in an object-oriented programming language such as C++ or by other data structures in other programming languages. A state machine is an automaton that transitions from one of a finite number of states to another of those states in response to particular inputs. The output of a state machine occurs upon a state transition and is based on the destination state and typically also on the input and/or source state. The OCC 322, UCM 324, and TCC 326 state machines model a call from the perspective of the originating protocol, a universal protocol, and the terminating protocol, respectively.

OCC 322 models a call from the perspective of the originating protocol. More specifically, OCC 322 receives messages in the originating protocol from originating protocol adapter 312 and, in response, transitions from one state to another state, resulting in outputting a non-protocol specific (i.e., universal protocol specific) message to UCM 324. Conversely, OCC 322 receives non-protocol specific messages from UCM 324 and, by responsively transitioning from one state to another, outputs originating protocol specific messages to originating protocol adapter 312.

Likewise, TCC 326 models the call from the perspective of the terminating protocol. More specifically, TCC 326 receives non-protocol specific messages from UCM 324 and, by responsively transitioning from one state to another, outputs terminating protocol specific messages to terminating protocol adapter 312. Conversely, TCC 326 receives messages in the terminating protocol from terminating protocol adapter 316 and, in response, transitions from one state to another state, resulting in outputting a non-protocol specific (i.e., universal protocol specific) message to UCM 324.

UCM 324 manages the call according to a universal call model that uses the universal protocol produced by OCC 322 and TCC 326. For the most part, UCM 324 merely passes the universal protocol messages between the OCC 322 and TCC 326, thereby implementing a protocol conversion of the originating protocol into the terminating protocol via a universal protocol. UCM 324 may conditionally send messages to OCC 322 and TCC 326, however, based on the capabilities and requirements of the originating and terminating protocols, respectively. For example, some protocols require acknowledgement messages to be sent in response to a call setup message and others protocols do not. In this case, UCM 324 is configured to determine whether the originating protocol needs the acknowledgement message and cause one to be generated, if needed.

Since UCM 324 is positioned to intercept messages passed between the OCC 322 and the TCC 326, UCM 324 can perform different kinds of message processing other than mere protocol conversion. In accordance with one embodiment of the present invention, UCM 324 is configured to provide call processing functionality for voice calls over a packet-switching network, for example, with feature transparency. If the primary communication network 130 is unable to handle a particular feature even after protocol conversion, UCM 324 arranges for the feature to be communicated over the auxiliary communication network 132 using external I/O controller 304, as described in more detail hereinafter.

Generic Backhaul Protocol

In one aspect of the present invention, signaling messages are backhauled from a gateway 110 or 150 to a media gateway controller 120 according to a generic backhaul protocol, which support multiple, incompatible signaling protocols, such as ISDN, DPNSS, SS7, and CAS. One function of the generic backhaul protocol is to manage the signaling channels supported by the gateways 110 and/or 150, for example, by providing a mechanism for commanding the signaling channels into and out of service. In addition, the generic backhaul protocol allows for the gateway 110 or 150 to autonomously transmit the state of its signaling channels to the media gateway controller 120 and for the media gateway controller 120 to query the state of the signaling channels of the gateways 110 or 150.

Another function of the generic backhaul protocol is to provide an instrumentality for conveying signaling information from the gateway 110 or 150 to the media gateway controller 120. Although the media gateway controller 120 are flexible enough to process as many layers of the protocol stack as possible, down to Layer 2, typical configurations involve multiple gateways 110 and 150 provided for a single media gateway controller 120. Accordingly, scalability is fostered by terminating some of the lower-level, non-call processing messages (typically Layer 2, but part of Layer 3 for some protocols) at the multiple gateways 110 and 150 rather than at the media gateway controller 120.

The division of labor between the gateways 110 and 150 and the media gateway controller 120 in terminating some of the lower-level, non-call processing messages for a specific protocol is referred to herein as a "split." Due to the differences between incompatible protocols, it has been found that the split will be located differently. For example, with the ISDN protocol, it is desirable to split the termination at the Layer 2 (Q.921) and the Layer 3 (Q.931) boundary. Thus, the ISDN gateway would be configured to terminate Q.921 messages and backhaul Q.931 messages to the media gateway controller 120. As another example, there is no clear boundary between Layer 2 and Layer 3 of DPNSS, so it has been found desirable to split the termination between non-call control messages at the gateway and call control messages at the media gateway controller 120. In fact, the split may be located at different boundaries within the same protocol to allow a broader range of gateways to be employed. For example, some gateways for the SS7 protocol split at the Layer 2/Layer 3 boundary, supporting all MTP 1 and 2 functionality, while other SS7 gateways split at the MTP 3/User part boundary, supporting MTP 1, MTP 2, and MTP 3 functionality.

Since terminating messages from various signaling protocols, however, is preferably split at different boundaries, the generic backhaul protocol is designed to provide a superset of messages in support of various ways in which the split is implemented. Each signaling protocol may use somewhat different subsets of all the message types in the generic backhaul protocol, although some message types in the generic backhaul protocol, generally relating to management of the signaling channels, are used for all signaling protocols. For example, the Establish and Release messages for bringing a backhaul link into and out of service is one such common message type.

Figure 4:
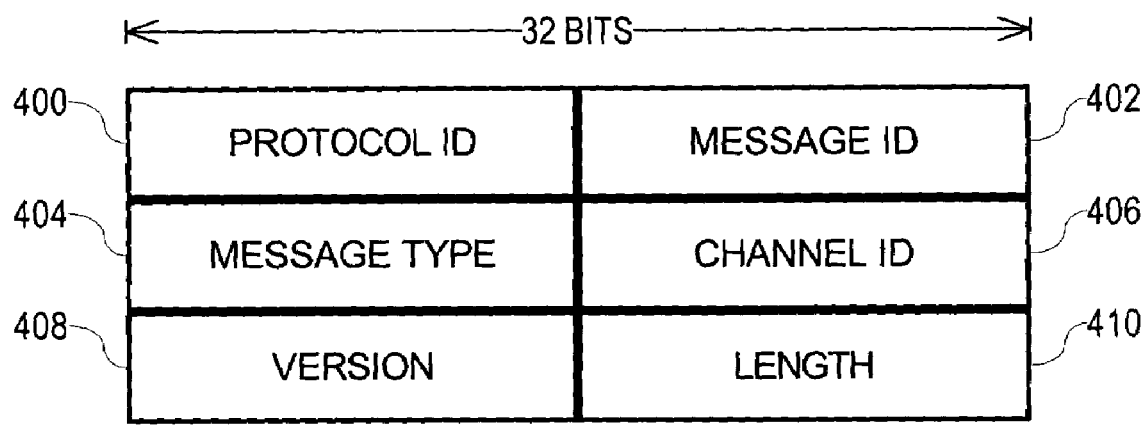
FIG. 4 depicts a message header according to a generic backhaul protocol.

Each message in the generic backhaul interface includes a message header for passing information useful for backhaul. One format of the message header is depicted in FIG. 4, where an exemplary message header includes a Protocol ID field 400, a Message ID field 402, a Message Type field 404, a Channel ID field 406, a Version field 408, and a Length field 410.

The Protocol ID field 400 holds a value that identifies the signaling protocol used by the gateway 110 or 150 and how processing the signaling protocol is split. Some gateways are multiplexed, allowing multiple signaling protocols to be used on a single channel. Where a signaling protocol can be split at different boundaries, e.g. SS7, the Protocol ID field 400 differentiates among the different split boundaries. An exemplary set of values for the Protocol ID field 400 is set forth in TABLE 1.

TABLE 1

PROTOCOL IDENTIFIERS

| Value | Protocol | Split (Gateway/Controller) |
| --- | --- | --- |
| 0x0 | Reserved | Reserved |
| 0x1 | MTP2 (SS7) | MTP 2/MTP 3 |
| 0x2 | MTP3 (SS7) | MTP 3/User Part |
| 0x3 | SCCP | SCCP/User Part |
| 0x4 | Q.921 (ISDN) | Q.921/Q.931 |
| 0x6 | DPNSS | Layers 2, 3, HDLC/Call Control |
| 0x7 | CAS (MGCP) | CAS/MGCP |

The Message ID field 402 identifies whether the generic backhaul protocol message is a layer-to-layer message (0x0) or a management message (0x1). Most of the messages in the generic backhaul protocol are layer-to-layer messages. Among the management messages, the Management Channel Reset Request message is used to request the gateway 110 or 150 to reset the information on one or all channels and the Management Error Indication message is used to indicate an error.

The Channel ID field 406 indicates the channel, link, or SAP on the gateway 110 or 150. For example, the Channel ID field 406 can identify the physical port of a network connection used by the gateway 110 or 150 or a time slot on TDMA connection. Accordingly, the Channel ID 406 is dependent on the particular implementation of the gateway 110 or 150.

The Version field 408 identifies the particular version of generic backhaul protocol being employed and is used address upward and backward compatibility issues. The Length field 410 indicates the length of the message.

The Message Type field 404 identifies the type of the generic backhaul protocol message being passed between the gateway 110 or 150 and the media gateway controller 120. In one embodiment, the following layer-to-layer messages are supported, in which a "Request" message refers to a message sent by the media gateway controller 120 to gateway 110 or 150, which is acknowledged by the gateway 110 or 150 with a "Response" message. The gateway 110 or 150 uses an "Indication" message to autonomously provide information to the media gateway controller 120, which acknowledges with a "Confirm" message.

1. Establish {Request, Indication, Response, Confirmation}. These messages are used to establish a channel or to indicate that a channel has been established. The Establish Request message includes a 32-bit state value to request the gateway 110 or 150 to follow a normal procedure for establishing a channel, for resetting all data link connections simultaneously, or for resetting the data link connections sequentially. If the gateway 110 or 150 already has a channel established, then the gateway 110 or 150 would take no action but to return an Establish Response. These messages are used in support of backhauling every protocol.

2. Release {Request, Indication, Response, Confirmation}. These messages are used to release a channel or to indicate that a channel has been released. A 32-bit reason value is included to indicate with the management later generated the release, the physical alarm layer generated the release, or that Layer 2 should release and deny all requests from a far end to establish a channel. These messages are used in support of backhauling every protocol.

3. Data {Request, Indication}. These messages contain a PDU for backhauling a call signaling message. These messages are used in support of backhauling most protocols, i.e. ISDN, DPNSS, MTP 2 (SS7), except for the SS7 signaling protocol, when split at the Layer 3/User Part boundary, where specialized messages are used.

4. Unit Data {Request, Indication}. A Unit Data message contains a PDU, transmitted to or received by an unacknowledged transfer service. These messages are used in support of ISDN protocol backhaul.

5. MTP3 Data {Request, Indication}. An MTP3 Data message contains a SS7 User Part PDU and information from the MTP3 routing label, including the DPC, OPC, SIO, SLS, and priority. The SIO field contains the service indicator and sub-service field, and the priority field contains the priority of the messages from 0 to 3. These messages are used in support of MTP 3 (SS7) backhaul, i.e. SS7 signaling protocol, split at the Layer 3/User Part boundary.

6. MTP2 Status {Request, Indication, Response} The MTP2 Status Request message is sent from the media gateway controller 120 to cause an action on the gateway 110 or 150, which sends a MTP2 Status Response upon completion. The actions of an MTP2 Status Request are indicated by a 32-bit value for requesting a local processor outage, a local processor outage recovered, an emergency alignment procedure, a normal alignment procedure, a flushing of the transmit and retransmit buffers, and a continuation. The MTP2 Status Indication message, sent by the gateway 110 or 150 to the media gateway controller 120, indicates a condition on a channel, such as entered/exited local process outage, entered/exited a congested state, physical interface operational/down, protocol error, remote/entered/exited congestion, and remote entered/exited processor outage. These messages are used in support of MTP 2 (SS7) Backhaul, i.e. SS7 signaling protocol, split at the Layer 2/Layer 3 boundary.

7. MTP3 Status {Request, Indication, Response}. The MTP3 Status Request message is sent from the media gateway controller 120 to get a MTP3 Status Response from the gateway 110 or 150. The MTP3 Status Request and the MTP3 Status Response both include a DPC point code of interest, and the MTP3 Status Response indicates a pause status, a resume status, or a congested (multi-level) status for the point code. The MTP3 Status Indication is an autonomous message from the gateway 110 or 150 to the media gateway controller 120 to indicate for a DPC point code a pause status, a resume status, a multi-level congested status, an unavailable remote user part, a beginning/end of MTP restart, and an end of congestion. These messages are used in support of MTP 3 (SS7) backhaul.

8. MTP2 Data Retrieval {Request, Indication, Response}. The MTP2 Data Retrieval Request message is used during a changeover procedure to request a BSN, retrieve PDUs from the retransmit queue or to flush the PDUs from the retransmit queue. These messages are used in support of MTP 2 (SS7) backhaul.

9. MTP2 Data Retrieve Done {Indication}. This message is similar to an MTP2 Data Retrieval Indication message except that it further indicates that the last PDU has been retrieve from the retransmit queue. This message is used in support of MTP 2 (SS7) backhaul.

10. Flow Control {Indication, Confirmation}. The Flow Control Indication message is sent by the gateway 110 or 150 to indicate a need for starting or stopping flow control, which would typically occur if the gateway 110 or 150 reached a buffer threshold (e.g. 80% full). In response, the media gateway controller 120 should confirm and take appropriate action. This message is used in support of MTP 2 (SS7) backhaul.

In order for the gateway 110 or 150 to be used with media gateway controller 120, the physical configuration data of the gateway 110 or 150, such as the physical number of channels, the type of gateway, etc.) is registered with the media gateway controller 120. In addition, the media gateway controller 120 maintains information about the signal protocol configuration data of the gateway 110 or 150, such as Q.921 timers and counters, network/user indication, switch type, and provides an interface for a network operator to modify the signal protocol configuration data.

When the media gateway controller 120 and the gateway 110 or 150 are initialized, for example, on boot-up, they set up a session including, for example, an IP connection, to pass the Establish messages to bring one or more channels of the gateway 110 or 150 into service. When a channel of the gateway 110 or 150 is in service, the gateway 110 or 150 is ready to accept Voice over IP calls. Release messages are used, for example in network maintenance, reconfiguration or trouble-shooting, to place channels of the gateway 110 or 150 out of service.

When a voice call is received at gateway 110 from originating node 110, the signaling data in the voice call is extracted and packaged into a message body. A message header including the Channel ID 406 for the channel the voice call was received from and/or a Protocol ID 400 for the protocol of the voice call is aggregated with the message body to form a generic backhaul protocol message, such as a Data Indication message or an MTP3 Data Indication. The generic backhaul protocol message is transmitted from the gateway 110 to the media gateway controller 120 over connection 140, which controls the gateway 150 directly (or indirectly through another media gateway controller) to establish a connection through packet-switching network 130 for the voice call. Signaling data, in the other direction, from the terminating node 160 via gateway 150 is eventually received at the media gateway controller 120, converted into generic backhaul protocol messages, and transmitted to gateway 110.

The gateway 110 can continue to accept voice calls from other channels and extract and backhaul the signaling data over the same connection 140, since the message headers of the backhauled signaling data includes fields to disambiguate the signaling data. Therefore, the media gateway controller 120 need not consume system resources such as IP connections or file descriptors on a per channel or per channel-protocol pair basis, but on a more scalable per gateway 110 or 150 basis.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A computer-readable medium for backhauling signaling data in voice calls to a media gateway controller, the computer-readable medium carrying one or more instructions which, when executed by one or more processors cause the one or more processors to perform the steps of:

receiving a first voice call in accordance with a first signaling protocol;

extracting the first signaling data from the first voice call;

packaging the first signaling data into a first message, the first message including a first message header indicating the first signaling protocol and first message body including a first protocol data unit encapsulating the first signaling data; and transmitting the first message to the media gateway controller.

2. The computer-readable medium of claim 1, further comprising one or more additional instructions which, when executed by the one or more processors, cause the one or more processors to perform the additional steps of:

receiving a second voice call with a first signaling protocol incompatible with the first signaling protocol;

extracting the second signaling data from the second voice call;

packaging the second signaling data into a first message, the second message including a first message header indicating the second signaling protocol and second message body including a second protocol data unit encapsulating the second signaling data; and transmitting the second message to the media gateway controller.

3. The computer-readable medium of claim 2, wherein:
the first voice call is received over a first channel;
the second voice call is received over a second channel;
the first message header further indicates the first channel; and
the second message header further indicates the second channel.

4. The computer-readable medium of claim 3, wherein the first channel and the second channel are of the same protocol type and the first voice call and the second voice call are multiplexed over the same channel.

5. The computer-readable medium of claim 3, wherein the first channel and the second channel are of different protocol types.

6. A gateway for backhauling signaling data in voice calls to a media gateway controller, the gateway being configured to:

receive a first voice call in accordance with a first signaling protocol;

extract the first signaling data from the first voice call;

package the first signaling data into a first message, the first message including a first message header indicating the first signaling protocol and first message body including a first protocol data unit encapsulating the first signaling data; and transmit the first message to the media gateway controller.

7. The gateway of claim 6, wherein the gateway is further configured to:

receive a second voice call with a first signaling protocol incompatible with the first signaling protocol;

extract the second signaling data from the second voice call;

package the second signaling data into a first message, the second message including a first message header indicating the second signaling protocol and second message body including a second protocol data unit encapsulating the second signaling data; and transmit the second message to the media gateway controller.

8. The gateway of claim 7, wherein:
the first voice call is received over a first channel;
the second voice call is received over a second channel;
the first message header further indicates the first channel; and
the second message header further indicates the second channel.

9. The gateway of claim 8, wherein the first channel and the second channel are of the same protocol type and the first voice call and the second voice call are multiplexed over the same channel.

10. The gateway of claim 8, wherein the first channel and the second channel are of different protocol types.

11. A gateway for backhauling signaling data in voice calls to a media gateway controller, the gateway comprising:

means for receiving a first voice call in accordance with a first signaling protocol;

means for extracting the first signaling data from the first voice call;

means for packaging the first signaling data into a first message, the first message including a first message header indicating the first signaling protocol and first message body including a first protocol data unit encapsulating the first signaling data; and means for transmitting the first message to the media gateway controller.

12. The gateway of claim 11, wherein the gateway further comprises:

means for receiving a second voice call with a first signaling protocol incompatible with the first signaling protocol;

means for extracting the second signaling data from the second voice call;

means for packaging the second signaling data into a first message, the second message including a first message header indicating the second signaling protocol and second message body including a second protocol data unit encapsulating the second signaling data; and means for transmitting the second message to the media gateway controller.

13. The gateway of claim 12, wherein:
the first voice call is received over a first channel;
the second voice call is received over a second channel;
the first message header further indicates the first channel; and
the second message header further indicates the second channel.

14. The gateway of claim 13, wherein the first channel and the second channel are of the same protocol type and the first voice call and the second voice call are multiplexed over the same channel.

15. The gateway of claim 13, wherein the first channel and the second channel are of different protocol types.

16. A telecommunications device, comprising:
communication interface means in communication with a gateway;
processing means coupled to the communication interface; and
memory means coupled to the processing means and storing instructions which, when executed by the processing means, cause the telecommunications device to perform the steps of:

instantiating a plurality of protocol adapters for processing signaling data according to a plurality of signaling protocols;

receiving a first message from the gateway, the message including a first message header indicating the first signaling protocol and a first message body containing a first protocol data unit encapsulating the first signaling data; and identifying and causing a first protocol adapter that is instantiated to process signaling data according to the first signaling protocol to process the first signaling data encapsulated in the first protocol data unit based on the first message header.

17. The telecommunications device of claim 16, wherein the memory means stores additional instructions which, when executed by the processing means, cause the telecommunications device to perform the additional steps of:
  receiving a second message from the gateway, the message including a second message header indicating a second signaling protocol incompatible with the first signaling protocol and a second message body containing a second protocol data unit encapsulating the second signaling data; and
  identifying and causing a second protocol adapter that is instantiated to process signaling data according to the second signaling protocol to process the second signaling data encapsulated in the second protocol data unit based on the second message header.

18. The telecommunications device of claim 17, wherein:
  the first message header further indicates a first channel on the gateway;
  the second message header further indicates a second channel on the gateway;
  the memory means stores additional instructions which, when executed by the processing means, cause the telecommunications device to perform the additional steps of:
    instantiating a plurality of call instances for processing signaling data borne on a plurality of channels on the gateway;
    identifying and causing a first call instance that is instantiated to process a first voice call borne on the first channel and formatted according to the first signaling protocol to process the first signaling data based on the first message header; and
    identifying and causing a second call instance that is instantiated to process a second voice call borne on the second channel and formatted according to the second signaling protocol to process the second signaling data on the second message header.

19. The telecommunications device of claim 16, wherein the memory means stores additional instructions which, when executed by the processing means, cause the telecommunications device to perform the additional step of sending a message to the gateway to causing a channel of the gateway to come into or go out of service.

20. A method for processing data in a telecommunications device, the method comprising the computer-implemented steps of:
  instantiating a plurality of protocol adapters for processing signaling data according to a plurality of signaling protocols;
  receiving a first message from a gateway, the first message including a first message header indicating a first signaling protocol and a first message body containing a first protocol data unit encapsulating first signaling data; and
  identifying and causing a first protocol adapter that is instantiated to process signaling data according to the first signaling protocol to process the first signaling data encapsulated in the first protocol data unit based on the first message header.

21. The method of claim 20, further comprising the computer-implemented steps of:
  receiving a second message from the gateway, the message including a second message header indicating a second signaling protocol incompatible with the first signaling protocol and a second message body containing a second protocol data unit encapsulating second signaling data; and
  identifying and causing a second protocol adapter that is instantiated to process signaling data according to the second signaling protocol to process the second signaling data encapsulated in the second protocol data unit based on the second message header.

22. The method of claim 21, wherein:
  the first message header further indicates a first channel on the gateway;
  the second message header further indicates a second channel on the gateway;
  the method further comprises the computer-implemented steps of:
    instantiating a plurality of call instances for processing signaling data borne on a plurality of channels on the gateway;
    identifying and causing a first call instance that is instantiated to process a first voice call borne on the first channel and formatted according to the first signaling protocol to process the first signaling data based on the first message header; and
    identifying and causing a second call instance that is instantiated to process a second voice call borne on the second channel and formatted according to the second signaling protocol to process the second signaling data on the second message header.

23. The method of claim 20, further comprising the computer-implemented step of sending a message to the gateway to causing a channel of the gateway to come into or go out of service.

24. A computer-readable medium for processing data in a telecommunications device, the computer-readable medium carrying one or more instructions which, when processed by one or more processors, cause the one or more processors to perform the steps of:
  instantiating a plurality of protocol adapters for processing signaling data according to a plurality of signaling protocols;
  receiving a first message from a gateway, the first message including a first message header indicating a first signaling protocol and a first message body containing a first protocol data unit encapsulating first signaling data; and
  identifying and causing a first protocol adapter that is instantiated to process signaling data according to the first signaling protocol to process the first signaling data encapsulated in the first protocol data unit based on the first message header.

25. The computer-readable medium of claim 24, further comprising one or more additional instructions which, when executed by the one or more processors, causes the one or more processors to perform the additional steps of:
  receiving a second message from the gateway, the message including a second message header indicating a second signaling protocol incompatible with the first signaling protocol and a second message body containing a second protocol data unit encapsulating second signaling data; and
  identifying and causing a second protocol adapter that is instantiated to process signaling data according to the second signaling protocol to process the second signaling data encapsulated in the second protocol data unit based on the second message header.

26. The computer-readable medium of claim 25, wherein:
the first message header further indicates a first channel on the gateway;
the second message header further indicates a second channel on the gateway;
the computer-readable medium further comprises one or more additional instructions which, when executed by the one or more processors, causes the one or more processors to perform the additional steps of:
instantiating a plurality of call instances for processing signaling data borne on a plurality of channels on the gateway;
identifying and causing a first call instance that is instantiated to process a first voice call borne on the first channel and formatted according to the first signaling protocol to process the first signaling data based on the first message header; and
identifying and causing a second call instance that is instantiated to process a second voice call borne on the second channel and formatted according to the second signaling protocol to process the second signaling data on the second message header.

27. The computer-readable medium of claim 24, further comprising one or more additional instructions which, when executed by the one or more processors, causes the one or more processors to perform the additional step of sending a message to the gateway to causing a channel of the gateway to come into or go out of service.

28. A telecommunications device, comprising:
communication interface means in communication with a gateway;
processing means coupled to the communication interface; and
memory means coupled to the processing means and storing instructions which, when executed by the processing means, cause the telecommunications device to perform the steps of:
instantiating a plurality of call instances for processing signaling data borne on a plurality of channels of the gateway;
receiving a first message from the gateway, the message including a first message header indicating the first channel and a first message body containing a first protocol data unit encapsulating the first signaling data; and
identifying and causing a first call instance that is instantiated to process signaling data borne on the first channel to process the first signaling data encapsulated in the first protocol data unit based on the first message header.

29. The telecommunications device of claim 28, wherein the memory means stores additional instructions which, when executed by the processing means, cause the telecommunications device to perform the additional steps of:
receiving a second message from the gateway, the message including a second message header indicating a second channel of the gateway other the first channel and a second message body containing a second protocol data unit encapsulating the second signaling data; and
identifying and causing a second call instance that is instantiated to process signaling data borne on the second channel to process the second signaling data encapsulated in the second protocol data unit based on the second message header.

30. The telecommunications device of claim 29, wherein:
the first message header further indicates a first signaling protocol of the first protocol data unit;
the second message header further indicates a second signaling protocol of the second protocol data unit;
the memory means stores additional instructions which, when executed by the processing means, cause the telecommunications device to perform the additional steps of:
instantiating a plurality of protocol adapters for processing signaling data according to a plurality of signaling protocols;
identifying and causing a first protocol adapter that is instantiated to process the first voice call formatted according to the first signaling protocol to process the first signaling data based on the first message header; and
identifying and causing a second call instance that is instantiated to process the second voice call formatted according to a second signaling protocol to process the first signaling data.

31. The telecommunications device of claim 28, wherein the memory means stores additional instructions which, when executed by the processing means, cause the telecommunications device to perform the additional step of sending a message to the gateway to causing a channel of the gateway to come into or go out of service.

32. A method for processing data in a telecommunications device, the method comprising the computer-implemented steps of:
instantiating a plurality of call instances for processing signaling data borne on a plurality of channels of the gateway;
receiving a first message from the gateway, the message including a first message header indicating the first channel and a first message body containing a first protocol data unit encapsulating the first signaling data; and
identifying and causing a first call instance that is instantiated to process signaling data borne on the first channel to process the first signaling data encapsulated in the first protocol data unit based on the first message header.

33. The method of claim 32, further comprising the computer-implemented steps of:
receiving a second message from the gateway, the message including a second message header indicating a second channel of the gateway other the first channel and a second message body containing a second protocol data unit encapsulating the second signaling data; and
identifying and causing a second call instance that is instantiated to process signaling data borne on the second channel to process the second signaling data encapsulated in the second protocol data unit based on the second message header.

34. The method of claim 33, wherein:
the first message header further indicates a first signaling protocol of the first protocol data unit;
the second message header further indicates a second signaling protocol of the second protocol data unit;
the method further comprises the computer-implemented steps of:
instantiating a plurality of protocol adapters for processing signaling data according to a plurality of signaling protocols;

identifying and causing a first protocol adapter that is instantiated to process the first voice call formatted according to the first signaling protocol to process the first signaling data based on the first message header; and identifying and causing a second call instance that is instantiated to process the second voice call formatted according to a second signaling protocol to process the first signaling data.

35. The method of claim 32, further comprising the computer-implemented step of sending a message to the gateway to causing a channel of the gateway to come into or go out of service.

36. A computer-readable medium for processing data in a telecommunications device, the computer-readable medium carrying one or more instructions which, when executed by one or more processors, cause the one or more processors to perform the steps of:

instantiating a plurality of call instances for processing signaling data borne on a plurality of channels of the gateway;

receiving a first message from the gateway, the message including a first message header indicating the first channel and a first message body containing a first protocol data unit encapsulating the first signaling data; and identifying and causing a first call instance that is instantiated to process signaling data borne on the first channel to process the first signaling data encapsulated in the first protocol data unit based on the first message header.

37. The computer-readable medium of claim 36, further comprising one or more additional instructions which, when executed by the one or more processors, cause the one or more processors to perform the additional steps of:

receiving a second message from the gateway, the message including a second message header indicating a second channel of the gateway other the first channel and a second message body containing a second protocol data unit encapsulating the second signaling data; and identifying and causing a second call instance that is instantiated to process signaling data borne on the second channel to process the second signaling data encapsulated in the second protocol data unit based on the second message header.

38. The computer-readable medium of claim 37, wherein:

the first message header further indicates a first signaling protocol of the first protocol data unit;

the second message header further indicates a second signaling protocol of the second protocol data unit;

the computer-readable medium further comprises one or more additional instructions which, when executed by the one or more processors, cause the one or more processors to perform the additional steps of:

instantiating a plurality of protocol adapters for processing signaling data according to a plurality of signaling protocols;

identifying and causing a first protocol adapter that is instantiated to process the first voice call formatted according to the first signaling protocol to process the first signaling data based on the first message header; and identifying and causing a second call instance that is instantiated to process the second voice call formatted according to a second signaling protocol to process the first signaling data.

39. The computer-readable medium of claim 36, further comprising one or more additional instructions which, when executed by the one or more processors, cause the one or more processors to perform the additional step of sending a message to the gateway to causing a channel of the gateway to come into or go out of service.

40. A method for backhauling signaling data in voice calls in a telecommunications network, the method comprising the computer-implemented steps of:

originating a first voice call bearing first signaling data according to a first signaling protocol;

controlling one or more gateways, in communication with the packet-switching network and a terminating node terminating the voice call, based on the first signaling data to provide voice communications over the packet-switching network between the first node and a terminating gateway; and extracting the first signaling data from the first voice call, packaging the first signaling data into a first message, and transmitting the first message to a media gateway controller, the first message including a first message header indicating the first signaling protocol and a first message body containing a first protocol data unit encapsulating the first signaling data.

41. The method of claim 40, further comprising the computer-implemented steps of:

extracting second signaling data from a second voice call;

packaging the second signaling data into a second message; and transmitting the second message to the media gateway controller, the second message including a second message header indicating the second signaling protocol and a second message body containing a second protocol data unit encapsulating the second signaling data.

42. The method of claim 41, wherein:

the first message header further indicates the first channel; and the second message header further indicates the second channel.

43. The method of claim 42, wherein the first channel and the second channel are of the same signaling protocol type and are multiplexed over the same IP session group.

44. The method of claim 42, wherein the first channel and the second channel are of different protocol types.

45. A method for backhauling signaling data in voice calls in a telecommunications network, the method comprising the computer-implemented steps of:

originating a first voice call bearing first signaling data;

controlling a first gateway and a terminating gateway, in communication with a packet-switching network and a terminating node terminating the voice call, based on the first signaling data to provide voice communications over the packet-switching network between the first node and the terminating gateway; and extracting the first signaling data from the first voice call, packaging the first signaling data into a first message, and transmitting the first message to the media gateway controller, the first message including a first message header indicating the first channel and a first message body containing a first protocol data unit encapsulating the first signaling data.

46. The method of claim 45, further comprising the computer-implemented steps of:

extracting second signaling data from a second voice call;

packaging the second signaling data into a second message; and transmitting the second message to the media gateway controller, the second message including a second message header indicating the second channel and a second message body containing a second protocol data unit encapsulating the second signaling data.

47. The method of claim 46, wherein:

the first signaling data is formatted according to a first signaling protocol;

the second signaling data is formatted according to a second signaling protocol;

the first message header further indicates the first signaling protocol; and the second message header further indicates the second signaling protocol.

48. The method of claim 47, wherein the first signaling protocol and the second signal protocol are compatible.

49. The method of claim 47, wherein the first signaling protocol and the second signaling protocol are incompatible.

* * * * *